United States Patent
Morikawa

(10) Patent No.: US 7,984,510 B2
(45) Date of Patent: Jul. 19, 2011

(54) TERMINAL DEVICE AND COMPUTER READABLE MEDIUM

(75) Inventor: Shigenori Morikawa, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 1068 days.

(21) Appl. No.: 11/818,934

(22) Filed: Jun. 15, 2007

(65) Prior Publication Data

US 2008/0005803 A1      Jan. 3, 2008

(30) Foreign Application Priority Data

Jun. 29, 2006   (JP) .................................. 2006-179796

(51) Int. Cl.
| | |
|---|---|
| G06F 7/04 | (2006.01) |
| H04L 9/32 | (2006.01) |
| G06Q 40/00 | (2006.01) |
| G06K 5/00 | (2006.01) |

(52) U.S. Cl. ............. 726/27; 713/172; 705/41; 340/5.6; 235/380

(58) Field of Classification Search .................... 726/26, 726/27, 29; 713/168, 172; 705/35, 39–43; 340/5.1, 5.2, 5.6; 235/375, 379, 380–382.5

See application file for complete search history.

(56) References Cited

U.S. PATENT DOCUMENTS

| | | | | |
|---|---|---|---|---|
| 2001/0019302 | A1* | 9/2001 | Yatsu et al. | 340/5.2 |
| 2002/0116330 | A1* | 8/2002 | Hed et al. | 705/39 |
| 2002/0174336 | A1* | 11/2002 | Sakakibara et al. | 713/172 |
| 2005/0203765 | A1* | 9/2005 | Maritzen et al. | 705/1 |

FOREIGN PATENT DOCUMENTS

| | | |
|---|---|---|
| JP | 2001-306987 A | 11/2001 |
| JP | 2005-216210 A | 8/2005 |

* cited by examiner

*Primary Examiner* — Gilberto Barron, Jr.
*Assistant Examiner* — Abdulhakim Nobahar
(74) *Attorney, Agent, or Firm* — Holtz, Holtz, Goodman & Chick, PC

(57) ABSTRACT

It is an object of the present invention to prevent illegal use of a terminal device, and to enhance security of the terminal device itself. Features of the present invention are: to store identification information for collation; to receive identification information for identifying an external communication terminal, which is transmitted from the external communication terminal; to collate the received identification with the stored identification information for collation so as to judge whether or not the received identification information is transmitted from an authorized communication terminal; to set a predetermined function from an execution-disabled state to an execution-enabled state when it is judged by the judgment that the received identification information is transmitted from the authorized communication terminal; and to allow the terminal device to execute the predetermined function.

5 Claims, 12 Drawing Sheets

FIG. 4

| | 133 |
|---|---|
| MANAGEMENT TERMINAL IDENTIFICATION INFORMATION | 0123456789 |

FIG. 5

| | 14 |
|---|---|
| PAYMENT FLAG | OFF |
| PAYMENT TIMER | 600 |
| KIN TIMER | 60 |
| PAYMENT LIMIT AMOUNT REGISTER | 0 |
| USER TERMINAL IDENTIFICATION INFORMATION REGISTER | 0 |

FIG. 6

| | 115 |
|---|---|
| CARD NUMBER | XXXX-XXXX-XXXX-XXXX |
| VALID TERM | XX/XX |
| OWNER NAME | XXXXXXX XXXXXXX |
| USER TERMINAL IDENTIFICATION INFORMATION | 09012345678 |
| PAYMENT LIMIT AMOUNT | 1000 |

DISPLAY SCREEN 12  DTMF SIGNAL

TERMINAL DEVICE AND COMPUTER READABLE MEDIUM

BACKGROUND OF THE INVENTION

1. Field of the Invention

The present invention relates to a terminal device.

2. Description of Related Art

Heretofore, in a variety of industrial fields, an information communication system that connects an upper-level information processing terminal and a lower-level information processing terminal to each other through a network and communicates information therebetween has been developed and utilized. In such information communication system, to ensure security thereof in operation and to strengthen a management scheme thereof against an unauthorized operation have become important subjects.

For example, in an information communication system (payment system) that makes purchase/payment by using credit cards, IC cards, or the like (hereinafter, referred to as payment cards), there has been a possibility that the payment cards may be used illegally when the payment cards are passed to a third party by being lost, stolen, and so on. Therefore, a variety of measures for enhancing the security of the system have been heretofore proposed. For example, there has been proposed a technology for delivering a call from a payment processing apparatus to a cellular phone of each card owner, and performing authentication of the card owner and payment of an article desired to be purchased thereby based on personal identification number inputted from the cellular phone that has received the call (for example, see Japanese Patent Application Publication Laid-open No. 2001-306987A). Moreover, there has been proposed a technology for associating the card for payment (payment card) and a mobile terminal with each other, and performing the authentication for confirming the identity of the card owner based on a position of the mobile terminal and a place of a terminal (the payment processing apparatus) in which the payment card is used (for example, see Japanese Patent Application Publication Laid-open No. 2005-216210A).

However, the technology in Japanese Patent Application Publication Laid-open No. 2001-306987A is the one to determine whether or not the payment is possible between the payment processing apparatus and each cellular phone of the user. Consequently, for each payment processing apparatus for use, it is necessary to perform the authentication for the cellular phones of the users, and there is a problem that the technology lacks convenience.

Moreover, since the technology cannot restrict functions inherent in the payment card, there is a possibility that information (for example, the personal identification number, and the like) stored in the card may be read or tampered.

SUMMARY OF THE INVENTION

It is an object of the present invention to prevent illegal use of the terminal device, and to enhance the security of the terminal device itself.

In accordance with a first aspect of the invention, a terminal device includes: an identification information storage section to store identification information for collation; a reception section to receive identification information for identifying an external communication terminal, the identification information being transmitted from the external communication terminal; a judgment section to collate the identification information received from the reception section with the identification information for collation stored in the identification information storage section, so as to judge whether or not the received identification information is transmitted from the authorized communication terminal; a setting section to set a predetermined function of the terminal device from an execution-disabled state to an execution-enabled state when the judgment section judges that the received identification information is transmitted from the authorized communication terminal; and a control section to allow the terminal device to execute the function set in the execution-enabled state by the setting section.

According to the present invention, only when it is judged that the communication is made from the authorized communication terminal, the predetermined function of the terminal device itself can be executed. Accordingly, the illegal use of the terminal device can be prevented, and the security of the terminal device itself can be enhanced.

BRIEF DESCRIPTION OF THE DRAWINGS

The aforesaid and further objects, features and advantages of the present invention will become more apparent from the following detailed description when read in conjunction with the accompanying drawings, in which:

FIG. 4 is a view showing an example of management-use identification information stored in a ROM of the payment card;

FIG. 5 is a view showing an example of a variety of parameters stored temporarily in a RAM of the payment card;

FIG. 6 is a view showing an example of a setting information management table stored in a storage section of the payment card;

DETAILED DESCRIPTION OF THE PREFERRED EMBODIMENTS

An embodiment of the present invention will be described below in detail with reference to the drawings. In this embodiment, an example is shown, where a terminal device of the present invention is applied to a payment card, such as a credit card and an IC card, for use in electronic payment. However, the embodiment is not limited to this example.

Figure 1:
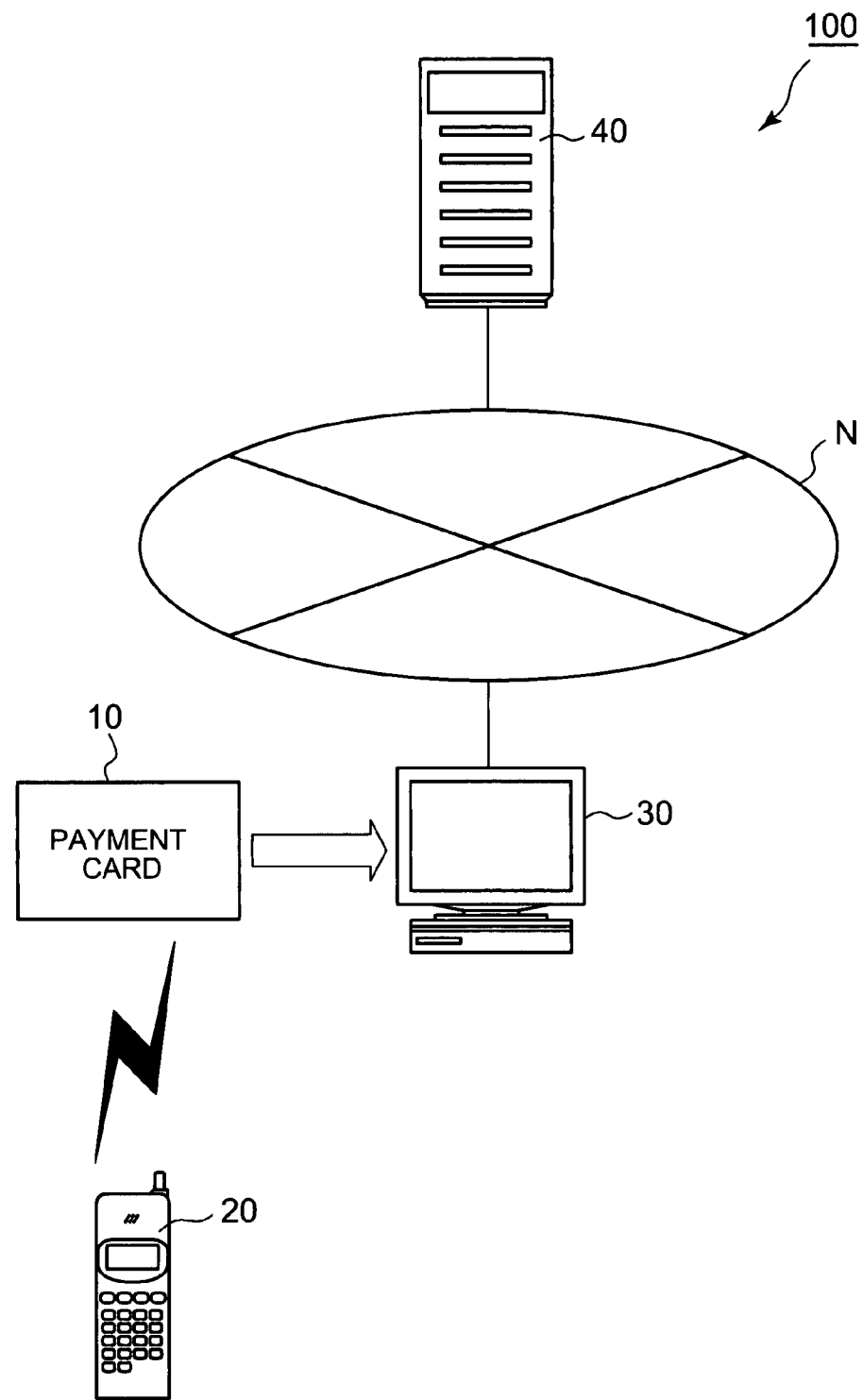
FIG. 1 is a view showing a composition of a payment system.

First, a composition of a payment system 100 in this embodiment will be described with reference to FIG. 1. As shown in FIG. 1, the payment system 100 is composed of a payment card 10, a communication terminal 20, a payment processing apparatus 30, a card company server 40, and the like, and the payment processing apparatus 30 is connected to the card company server 40 through a network N. Note that the number and quantities of the respective instruments which compose the payment system 100 are not limited to those of the illustrated example.

The payment card 10 as the terminal device is the credit card, the IC card, or the like, which is distributed to each user utilizing the payment system 100, and it is possible for the user to make purchase/payment by using the payment card 10.

Figure 2:
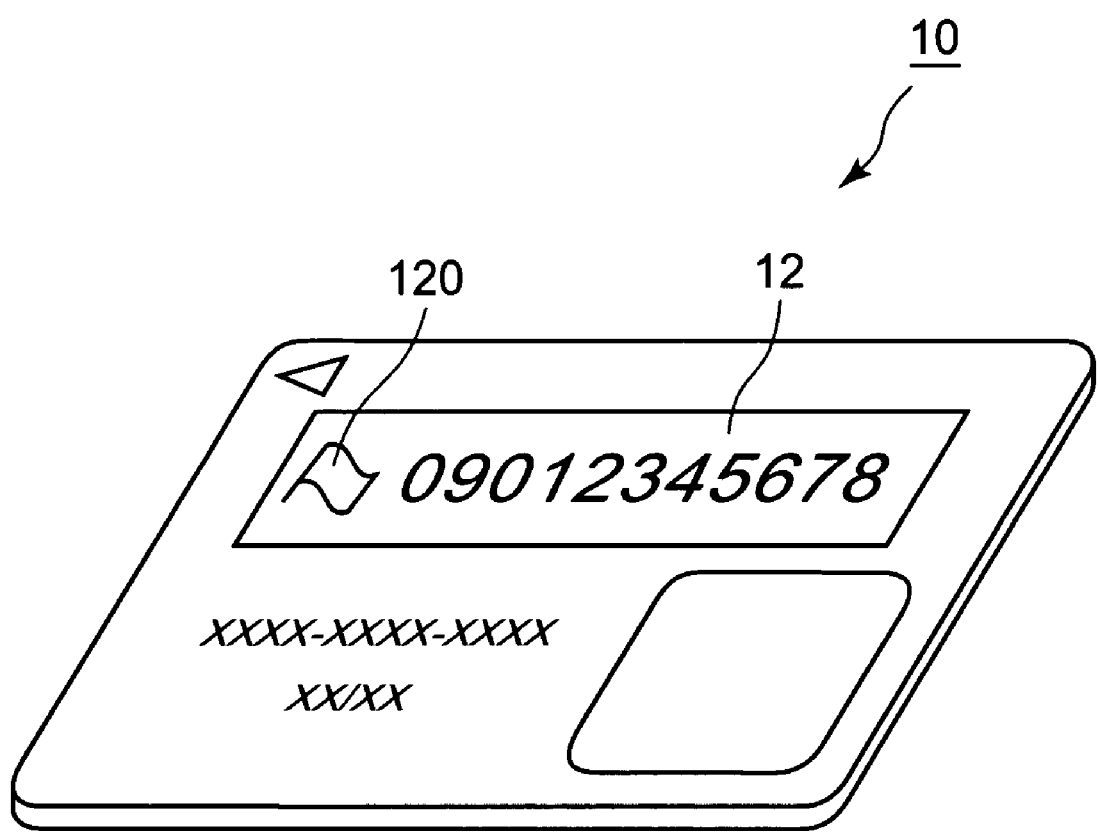
FIG. 2 is a view showing an exterior appearance of a payment card.
Figure 3:
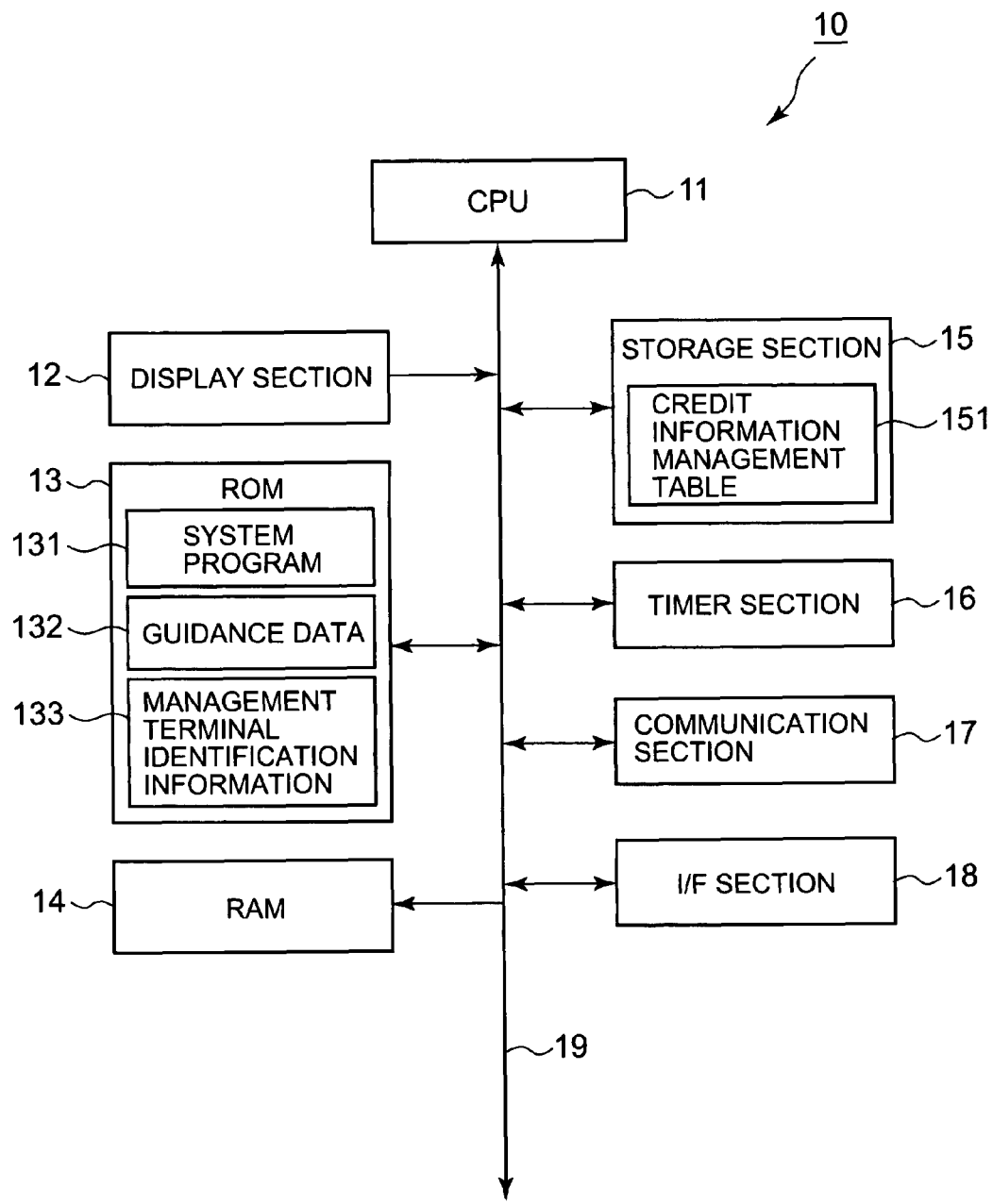
FIG. 3 is a block diagram showing an internal configuration of the payment card.

FIG. 2 is a view showing an exterior appearance of the payment card 10. As shown in FIG. 2, the payment card 10 is composed of a card-shaped casing portable by the user, and an internal configuration (of the terminal device) shown in FIG. 3 is housed in the casing. The card-shaped casing is formed into a rectangular shape, and as an example of a size thereof, the casing is formed to have a size of the credit card, in which a length of a long side is 85 mm, a length of a short side is 55 mm, and a thickness is 1 mm. Note that the size of the casing formed into the card shape is not limited to the above-described size. As shown in FIG. 2, a display section 12 is provided on an upper surface of the payment card 10. Moreover, on the display section 12, a mark (identification symbol) 120 to be described later is displayed together with a variety of information.

FIG. 3 is a block diagram showing the internal configuration of the payment card 10. As shown in FIG. 3, the payment card 10 is composed of a CPU 11, the display section 12, a ROM 13, a RAM 14, a storage section 15, a timer section 16, a communication section 17, an interface (I/F) section 18, and the like, and the respective sections are interconnected through a bus 19.

By using the RAM 14 as a work area, the CPU 11 executes a variety of processing in cooperation with a variety of programs prestored in the ROM 13, and controls operations of the respective sections composing the payment card 10 in a centralized manner.

The display section 12 is composed of a liquid crystal display (LCD) or electro luminescence display (ELD) panel, a display driver, and the like, and displays the variety of information based on a display signal from the CPU 11. Note that the mark 120 (see FIG. 2) displayed on the display section 12 is an identification symbol or an icon, which indicates whether the payment card 10 is in a payment-disabled state or a payment-enabled state. The display state of the mark 120 is switchable in response to a state of a payment flag to be described later.

The ROM 13 stores the programs necessary for the operation of the payment card 10, and data related to execution of the programs. As shown in FIG. 3, the ROM 13 stores a system program 131, guidance data 132, management terminal identification information 133, and the like.

The system program 131 is a program for allowing the CPU 11 to realize various basic functions of the payment card 10. In cooperation with the system program 131, the CPU 11 realizes, for example, a read/write control of a variety of setting information for the storage section 15, a display output control to the display section 12, a communication control by the communication section 17 and the I/F section 18 for an external device, and the like.

The guidance data 132 is information for explaining, to the user, an operation method and the like, which are related to the payment card 10. For example, as the guidance data 132, there are stored audio data, video data (including a still image), text data, and the like, which instruct the user about the operation method. Note that, in this embodiment, the guidance data 132 is the audio data. The CPU 11 reads out the guidance data 132, and transmits the guidance data as an audio signal to the communication terminal 20 through the communication section 17, thereby providing a guidance by voice (hereinafter, referred to as an audio guidance) through the communication terminal 20 to the user.

In the management terminal identification information 133, there are preregistered a telephone number, address information, and the like of the management-use communication terminal 20 connected to the payment card 10 through the communication section 17 in user terminal identification information registration processing (see FIG. 11) to be described later. Here, the management-use communication terminal 20 is a communication terminal, such as a PC and a mobile communication terminal, that belongs to a carrier or the like who issues/manages the payment card 10, and is a device capable of registering a telephone number of an owner thereof in a credit information management table 151 to be described later. Moreover, the address information is intrinsic information pregiven to the communication terminal 20, and for example, includes a manufacturing number, a serial number, an IP address, a MAC address, a Bluetooth address, a Bluetooth clock, and the like, which are unique to each instrument.

FIG. 4 is a view showing an example of the management terminal identification information 133 stored in the ROM 13. Note that FIG. 4 shows an example where the telephone number (0123456789) of the management-use communication terminal 20 is registered as the management terminal identification information 133.

The CPU 11 uses the management terminal identification information 133 as collation-use terminal identification information, and collates the collation-use terminal identification information with terminal identification information inputted from the outside through the communication section 17, thereby judges whether or not the transmission (communication) has been made from the authorized communication terminal 20 corresponding to the management terminal identification information, that is, from the management-use communication terminal 20.

The RAM 14 becomes a temporal storage area for the programs, input or output data, parameters, and the like, which are read out from the ROM 13, in the variety of processing executed/controlled by the CPU 11.

FIG. 5 is a view showing an example of a variety of the parameters stored temporarily in the RAM 14 in each processing to be described later. As shown in FIG. 5, in the RAM 14, there are temporarily stored the payment flag (ON/OFF) that sets whether or not a current state is the payment-enabled state, a payment timer (600) that shows a time during which payment processing is permitted, a KIN (key in) timer (60) that shows a key-input standby time for the variety of information, a payment limit amount register that sequentially stores inputted payment limit amounts, a user terminal identification information register that sequentially stores the inputted user terminal identification information, and the like. Note that, in this embodiment, a state of the payment flag at a usual (default) time is set to be (OFF) that shows the payment-disabled state.

The storage section 15 includes a non-volatile recording medium composed of a magnetic recording medium or a semiconductor memory, and stores the credit information management table 151 in which a variety of setting contents related to the electronic payment are registered in the recording medium.

FIG. 6 is a view showing an example of the variety of setting contents registered in the credit information management table 151. As shown in FIG. 6, in the credit information management table 151, there are registered a card number (XXXX-XXXX-XXXX-XXXX) unique to the payment card 10, a valid term (XX/XX) of the payment card 10, an owner name (user name) (XXXXXXX XXXXXXX) of the payment card 10, the user terminal identification information (for example, 09012345678) of the communication terminal (cellular phone) held by the owner of the payment card 10, a utilization limit amount (for example, 1000$), and the like.

In the user terminal identification information, there is registered the terminal identification information unique to the communication terminal 20, such as the telephone number and address information of the communication terminal 20 that makes a pair with the payment card 10 of the user's own, that is, the communication terminal 20 (cellular phone) held by the user (card owner) who owns the payment card 10. Here, the address information includes the IP address, the MAC address, the Bluetooth address, the Bluetooth clock, and the like, which are pregiven to the communication terminal 20. Note that FIG. 6 shows an example where the telephone number of the communication terminal 20 is registered as the user terminal identification information.

The CPU 11 uses, as the collation-use terminal identification information, the user terminal identification information registered in the credit information management table 151. Then, the CPU 11 collates the collation-use terminal identification information with the terminal identification information inputted from the outside through the communication section 17, thereby judges whether or not the transmission (communication) is made from the authorized communication terminal 20 corresponding to the user terminal identification information, that is, from the communication terminal 20 of the user who holds the payment card 10.

Moreover, in cooperation with the above-described system program 131, the CPU 11 reads out, as credit information, the card number, the valid tem, the user name, and the utilization limit amount, which are unique to the payment card 10, from among the variety of setting information registered in the credit information management table 151, and transmits the credit information to the payment processing apparatus 30 connected to the payment card 10 trough the interface (I/F) section 18, thus making it possible to make the purchase/payment.

The timer section 16 counts a time by taking as a reference a clock signal by a crystal oscillator (not shown) that always transmits a constant frequency, and outputs the counted time to the CPU 11.

The communication section 17 includes an antenna (not shown). The communication section 17 detects arrival of the call from the communication terminal 20 connected to the payment card 10 through a public telephone switching network, thereby establishes a communication with the communication terminal 20, receives a DTMF signal transmitted from the communication terminal 20, and outputs the received DTMF signal to the CPU 11. Moreover, the communication section 17 modulates the guidance data, which is read out from the ROM 13 by the CPU 11, into an audio signal, and transmits the audio signal to the communication terminal 20 communicably connected to the payment card 10.

Note that, as a radio signal modulation/demodulation method of the communication 17, for example, the phase shift keying (PSK) method, the personal digital cellular (PDC) method, the code division multiple access (CDMA) method, the global system for mobile communication (GMS) method, and the like can be used.

The interface (I/F) section 18 is a communication interface that performs a communication control for the variety of information transmitted between the payment card 10 and the payment processing apparatus 30 under the control of the CPU 11. As the I/F section 18, for example, there are mentioned a serial input/output terminal including a universal serial bus (USB) port and an RS-232C terminal, an infrared communication device in conformity with the Infrared Data Association (IrDA) standard, a wireless communication device in conformity with the Radio Frequency Identification System (RFID) standard, and the like. The I/F section 18 is connectable to an I/F section 36 of the payment processing apparatus 30 by wired communication means or wireless communication means. Specifically, the payment card 10 receives, through the I/F section 18, a request signal for requesting the credit information from the payment processing apparatus 30, and transmits, to the payment processing apparatus 30, the credit information read out from the credit information management table 151 by the CPU 11 in response to the request signal.

The communication terminal 20 is an information processing device such as the cellular phone, a PDA, and personal computer (PC). A call is originated from the communication terminal 20 to the payment card 10, specifically, the communication terminal 20 connects to the payment card 10, thus making it possible to activate predetermined functions of the payment card 10.

Figure 7:
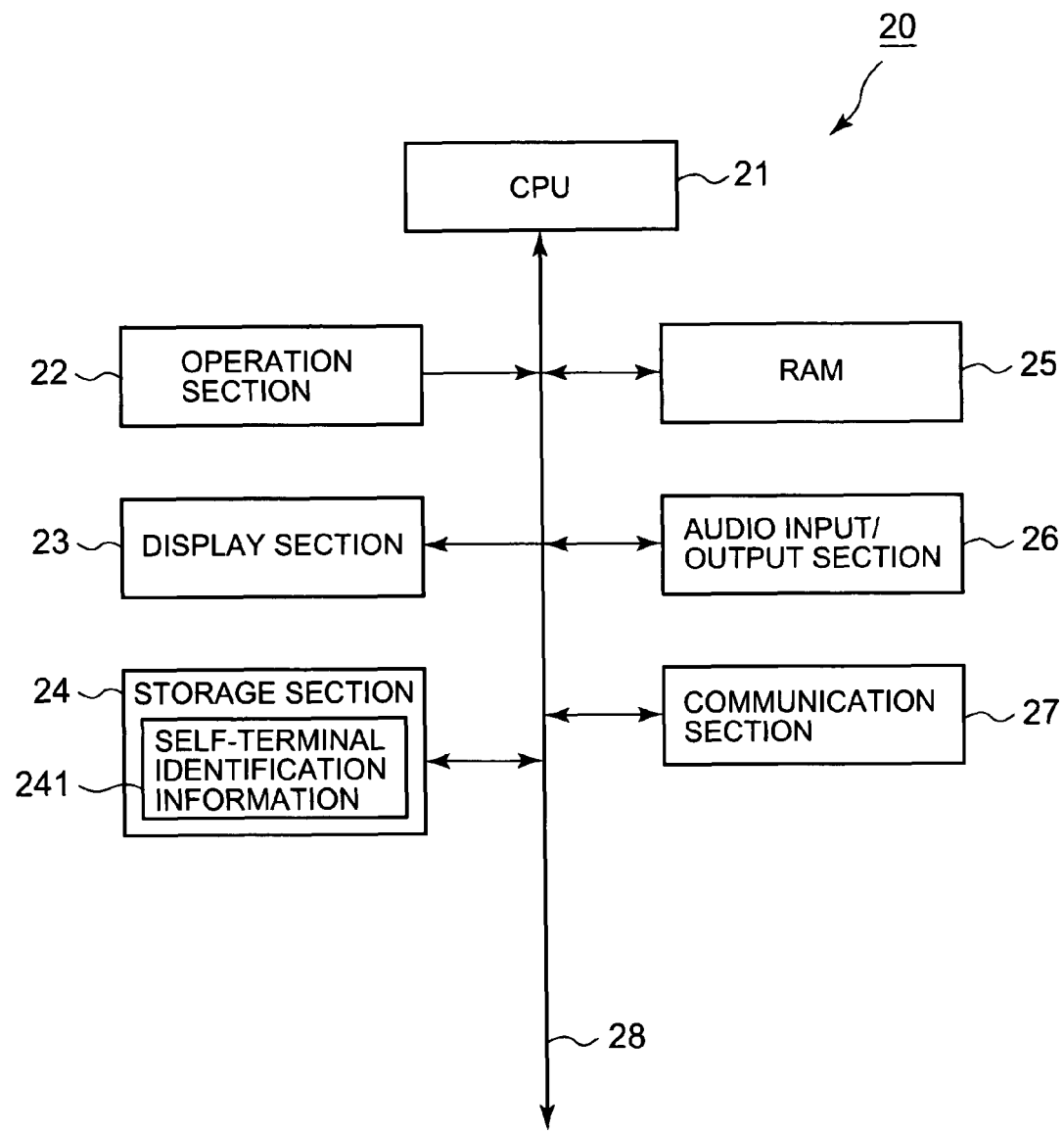
FIG. 7 is a block diagram showing an internal configuration of a communication terminal.

FIG. 7 is a block diagram showing an internal configuration of the communication terminal 20. As shown in FIG. 7, the communication terminal 20 is composed of a CPU 21, an operation section 22, a display section 23, a storage section 24, a RAM 25, an audio input/output section 26, a communication section 27, and the like, and the respective sections are interconnected through a bus 28.

By using the RAM 25 as a work area, the CPU 21 executes a variety of processing in cooperation with a variety of programs prestored in the storage section 24, and controls operations of the respective sections composing the communication terminal 20 in a centralized manner.

The operation section 22 includes a variety of input keys, and the like, and outputs, to the CPU 21, an input signal inputted by the operation of the user. The display section 23 is composed of an LCD or ELD panel, a display driver, and the like, and displays the variety of information based on a display signal from the CPU 21. Moreover, the display section 23 may adopt a mode of composing a touch panel integrally with the operation section 22.

The storage section 24 includes a non-volatile recording medium composed of a magnetic or optical recording medium or a semiconductor memory, and stores programs necessary for an operation of the communication terminal 20, and data related to execution of the programs. Moreover, the storage section 24 stores self-terminal identification information 241 as shown in FIG. 7.

Here, the self-terminal identification information 241 is identification information unique to the communication terminal 20, and for example, the telephone number, the manufacturing number, and the like, which are given to the communication terminal 20, are stored as the self-terminal identification information 241. In the case of originating a call through the communication section 27, the CPU 21 reads out the self-terminal identification information 241 from the storage section 24, and sends out this self-terminal identification information 241 as the terminal identification information to the device (payment card 10 or the like) on the call-receiving side, thereby notifies the device on the call-receiving side of the self-terminal identification information 241 of the self communication terminal 20. Note that, in this embodiment, the telephone number pregiven to the self communication terminal 20 is stored as the self-terminal identification information 241.

The RAM 25 becomes a temporal storage area for the programs, input or output data, parameters, and the like, which are read out from the storage section 24, in the variety of processing executed/controlled by the CPU 21.

The audio input/output section 26 is composed of an audio processing section, a speaker, a microphone (any of which is not shown), and the like. Under the control of the CPU 21, the audio input/output section 26 modulates voice collected by the microphone into an audio signal by the audio processing section, and outputs the audio signal through the communication section 27 to the external device communicably connected to this communication terminal 20. Moreover, under the control of the CPU 21, the audio input/output section 26 demodulates an audio signal, which is received from the payment card 10 through the communication section 27, by the audio processing section, and outputs the demodulated audio signal from the speaker.

Moreover, under the control of the CPU 21, the audio input/output section 26 outputs, from the speaker, a DTMF sound (push sound) corresponding to a button operated through the operation section 22, and outputs a DTMF signal corresponding to the DTMF sound through the communication section 27 to the device (payment card 10 or the like) communicably connected to this communication terminal 20.

The communication section 27 includes an antenna (not shown). The communication section 27 detects origination of the call to the external device (payment card 10 or the like) connected thereto through the public telephone switching network or arrival of the call from the external device, thereby establishes a communication with the external device, and transmits the audio signal and the DTMF signal, which are inputted from the audio input/output section 26, to the external device. Moreover, the communication section 27 receives an audio signal or the like, which is transmitted from the external device communicably connected to this communication terminal 20, and outputs the audio signal or the like to the audio input/output section 26.

Note that, as a radio signal modulation/demodulation method of the communication section 27, for example, as in the above-described communication section 17, the PSK method, the PDC method, the CDMA method, the GMS method, and the like can be used.

The payment processing apparatus 30 is a point of sale (POS) terminal, a payment terminal, an electronic cash register (ECR), or the like, which is installed in a retail store, a shop, a convenience store, or the like, and has a payment function. Based on the credit information received from the payment card 10 through the I/F section 18 to be described later, the payment processing apparatus 30 inquires the card company server 40 about a credit limit of the user of the payment card 10, which is related to the credit information, and performs the payment processing based on a result (Yes/No) of the inquiry for the credit limit.

Figure 8:
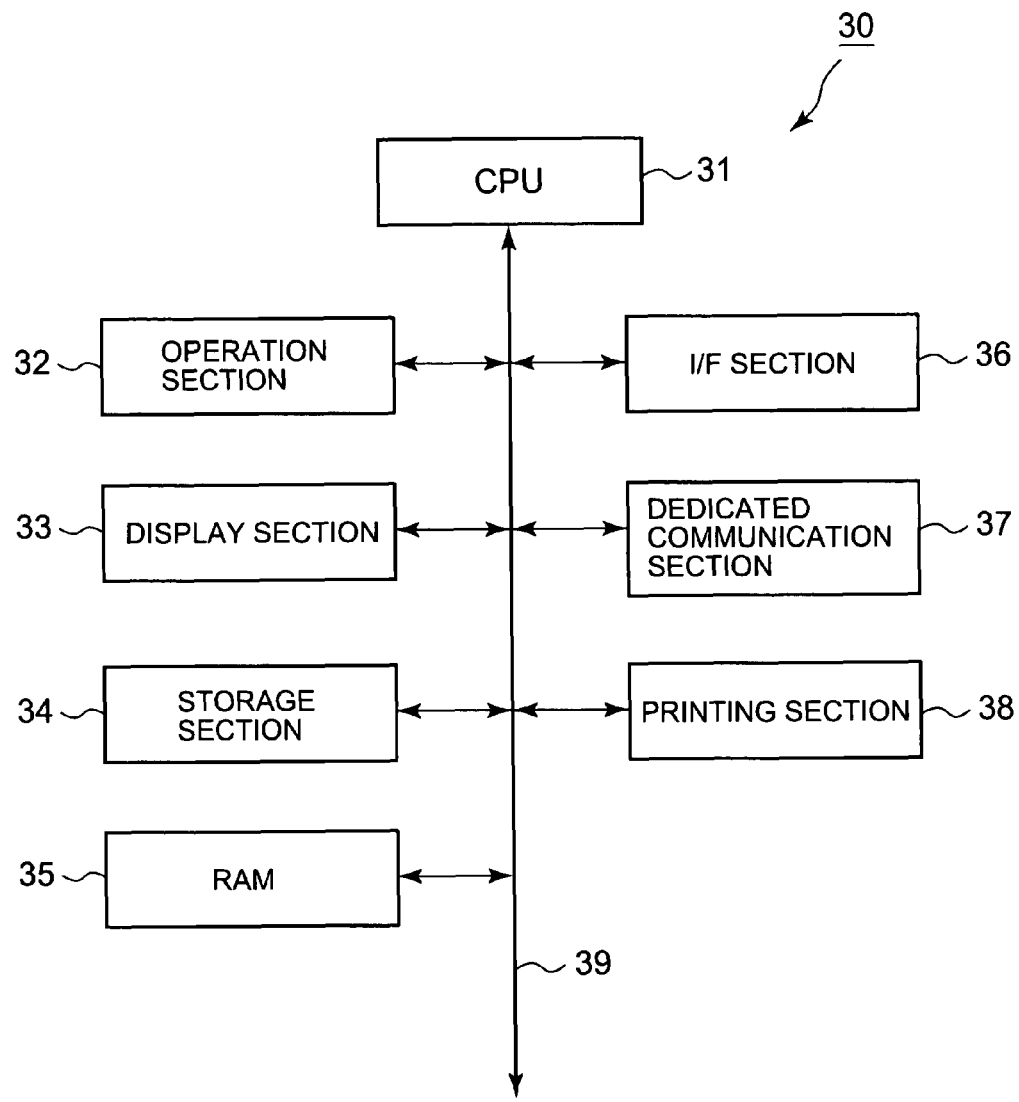
FIG. 8 is a block diagram showing an internal configuration of a payment processing apparatus.

FIG. 8 is a block diagram showing an internal configuration of the payment processing apparatus 30. As shown in FIG. 8, the payment processing apparatus 30 is composed of a CPU 31, an operation section 32, a display section 33, a storage section 34, a RAM 35, an interface (I/F) section 36, a dedicated communication section 37, a printing section 38, and the like, and the respective sections are interconnected through a bus 39.

By using the RAM 35 as a work area, the CPU 31 executes a variety of processing in cooperation with a variety of programs prestored in the storage section 34, and controls operations of the respective sections composing the payment processing apparatus 30 in a centralized manner.

The operation section 32 includes a variety of input keys, and the like, and outputs, to the CPU 31, an input signal inputted by the operation of the user. The display section 33 is composed of an LCD or ELD panel, a display driver, and the like, and displays the variety of information based on a display signal from the CPU 31. Moreover, the display section 33 may adopt a mode of composing a touch panel integrally with the operation section 32.

The storage section 34 includes a non-volatile recording medium composed of a magnetic or optical recording medium or a semiconductor memory, and stores programs necessary for an operation of the payment processing apparatus 30, and data related to execution of the programs.

The RAM 35 becomes a temporal storage area for the programs, input or output data, parameters, and the like, which are read out from the storage section 24, in the variety of processing executed/controlled by the CPU 31.

The interface (I/F) section 36 is a communication interface that performs a communication control for the variety of information transmitted between the payment processing apparatus 30 and the payment card 10 under the control of the CPU 31. As the I/F section 36, for example, there are mentioned the serial input/output terminal including the USB port and the RS-232C terminal, the infrared communication device in conformity with the IrDA standard, the wireless communication device in conformity with the RFID standard, and the like. The I/F section 36 is connectable to the I/F section 18 of the payment card 10 by the wired communication means or the wireless communication means. Specifically, the payment processing apparatus 30 receives, through the I/F section 36, a request signal for requesting the credit information from the payment card 10, and receives the credit information transmitted from the payment card 10 in response to the request signal.

The dedicated communication section 37 is a network interface such as a modulator/demodulator (MODEM), a terminal adapter, and a LAN adapter. Under the control of the CPU 31, the dedicated communication section 37 performs a communication control for the variety of information transmitted between this payment processing apparatus 30 and the card company server 40 connected thereto through the network N. Note that, though no particular limitations are imposed on data communication protocol between the payment processing apparatus 30 and the card company server 40, it is preferable to use protocol considering security, for example, such as TLS/SSL, S/MIME, and IPsec. Moreover, unique protocol may be used.

The printing section 38 is a printing device of an inkjet type, a laser type, a thermal transfer type, a dot impact type, or the like. Under the control of the CPU 31, the printing section 38 prints a sales slip on a recording medium such as a recording sheet.

The card company server 40 is a server belonging to a card company that provides the payment card 10 and a payment service using the payment card 10. This card company server 40 is an information processing apparatus including a CPU, a ROM, a RAM, and the like, and is communicably connected to the payment processing apparatus 30 through the network N. Moreover, the card company server 40 includes database means (storage device) in which the credit information stored in the storage section 15 of the payment card 10, user information (information on address, age, gender, financial institution for use, and the like) of the user related to the credit information, a history information recording the past utilization history of the user, and the like are registered in association with one another for each payment card 10 distributed to each user.

Upon receiving the credit information from the payment processing apparatus 30, the CPU of the card company server 40 refers to the database means, retrieves the credit information, the user information, the history information, and the like, which are associated with the received credit information, and reads out the information that applies to the received credit information. Then, the CPU decides a credit limit state (Yes/No) of the user based on these pieces of information, and transmits the credit limit information to the payment processing apparatus 30. The payment processing apparatus 30 that has received the credit limit information judges whether or not the payment card 10 is usable based on the credit limit information.

Moreover, upon receiving sales amount information to be described later from the payment processing apparatus 30, the CPU of the card company server 40 makes money transfer with the financial institution used by the user, which is associated with the credit information, based on a sales amount instructed by the sales amount information. Then, the CPU additionally records a history of this transaction to the history information.

Next, the operation of the payment card 10 will be described with reference to FIGS. 9 to 14.

Figure 9:
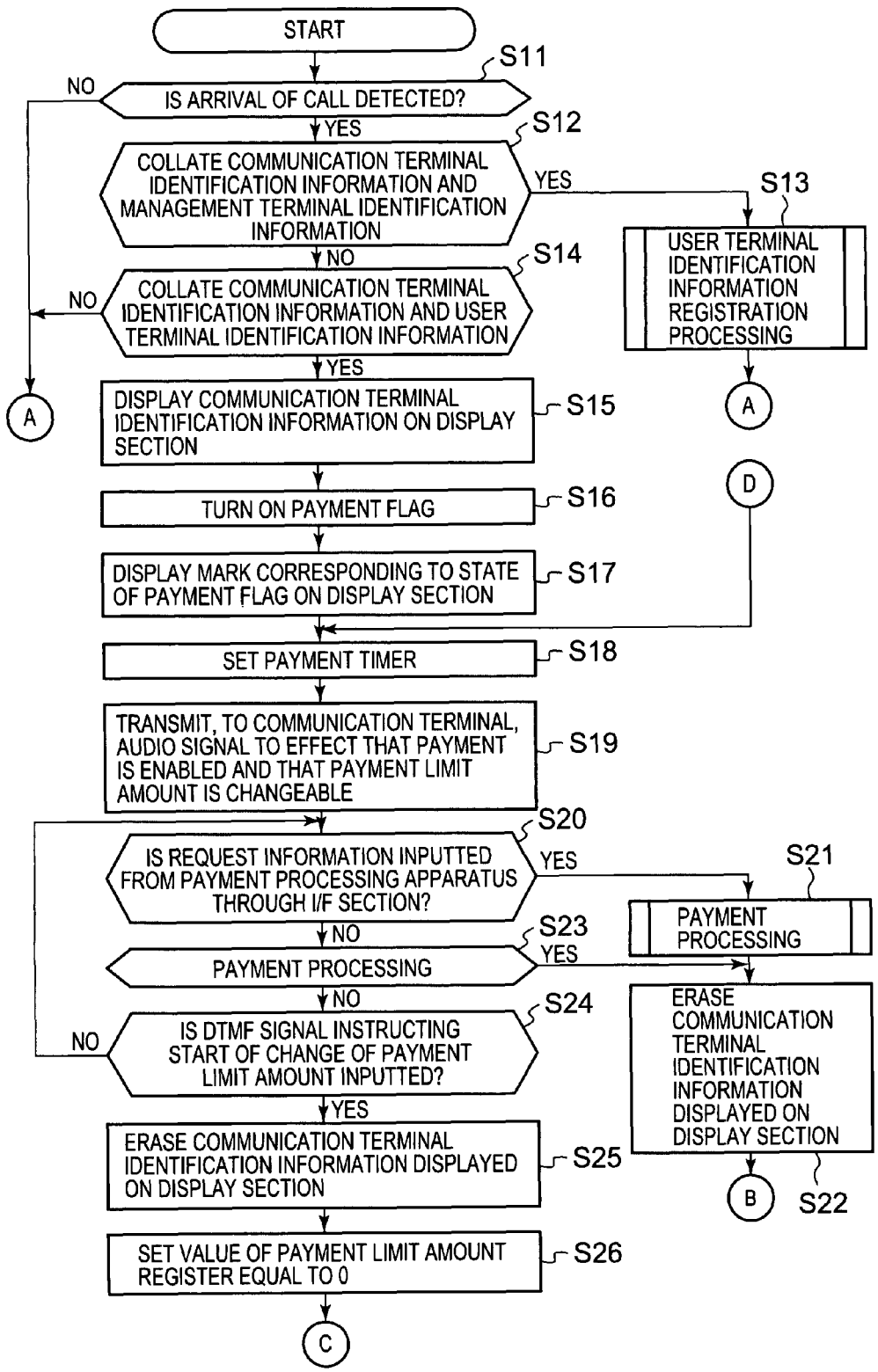
FIG. 9 is a flowchart showing a flow of processing when the payment card receives a call.
Figure 10:
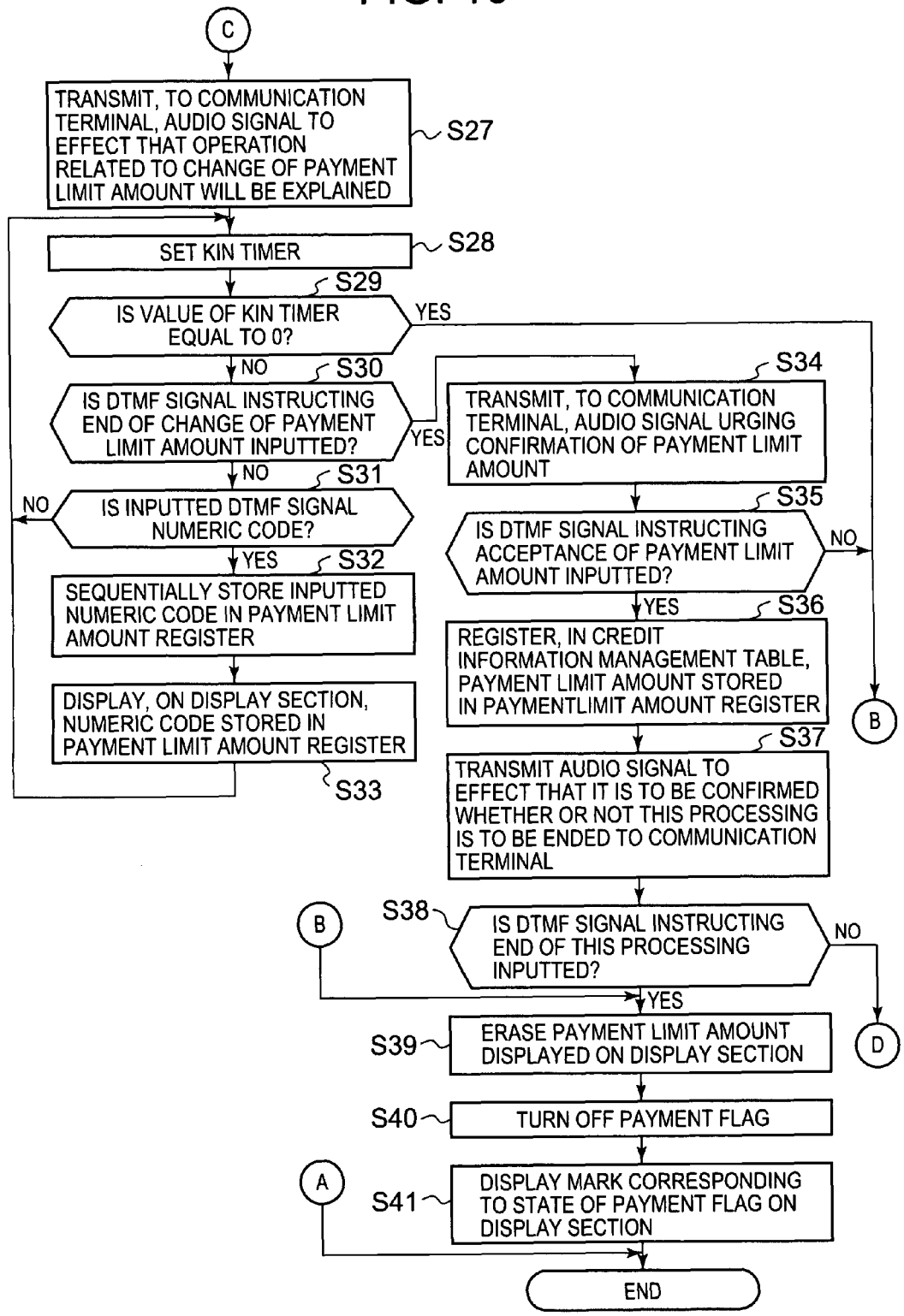
FIG. 10 is a flowchart showing the flow of the processing when the payment card receives the call.

FIG. 9 and FIG. 10 are flowcharts showing a flow of the processing when the payment card 10 receives the call. Note that this processing shows processing executed by cooperation between the CPU 11 and the variety of programs stored in the ROM 13.

First, it is judged whether or not the arrival of the call from the communication terminal 20 is detected (Step S11). Here, when it is judged that the arrival of the call is not detected (Step S11: No), this processing is immediately ended. Meanwhile, when it is judged that the arrival of the call is detected (Step S11: Yes), the terminal identification information (telephone number) sent out from the communication terminal 20 on the call origination side and the management terminal identification information 133 stored in the ROM 13 are collated with each other (Step S12).

Here, when it is judged that the terminal identification information and the management terminal identification information 133 coincide with each other (Step S12: Yes), the processing proceeds to the user terminal identification information registration processing of Step S13. The user terminal identification information registration processing of Step S13 will be described with reference to FIG. 11.

Figure 11:
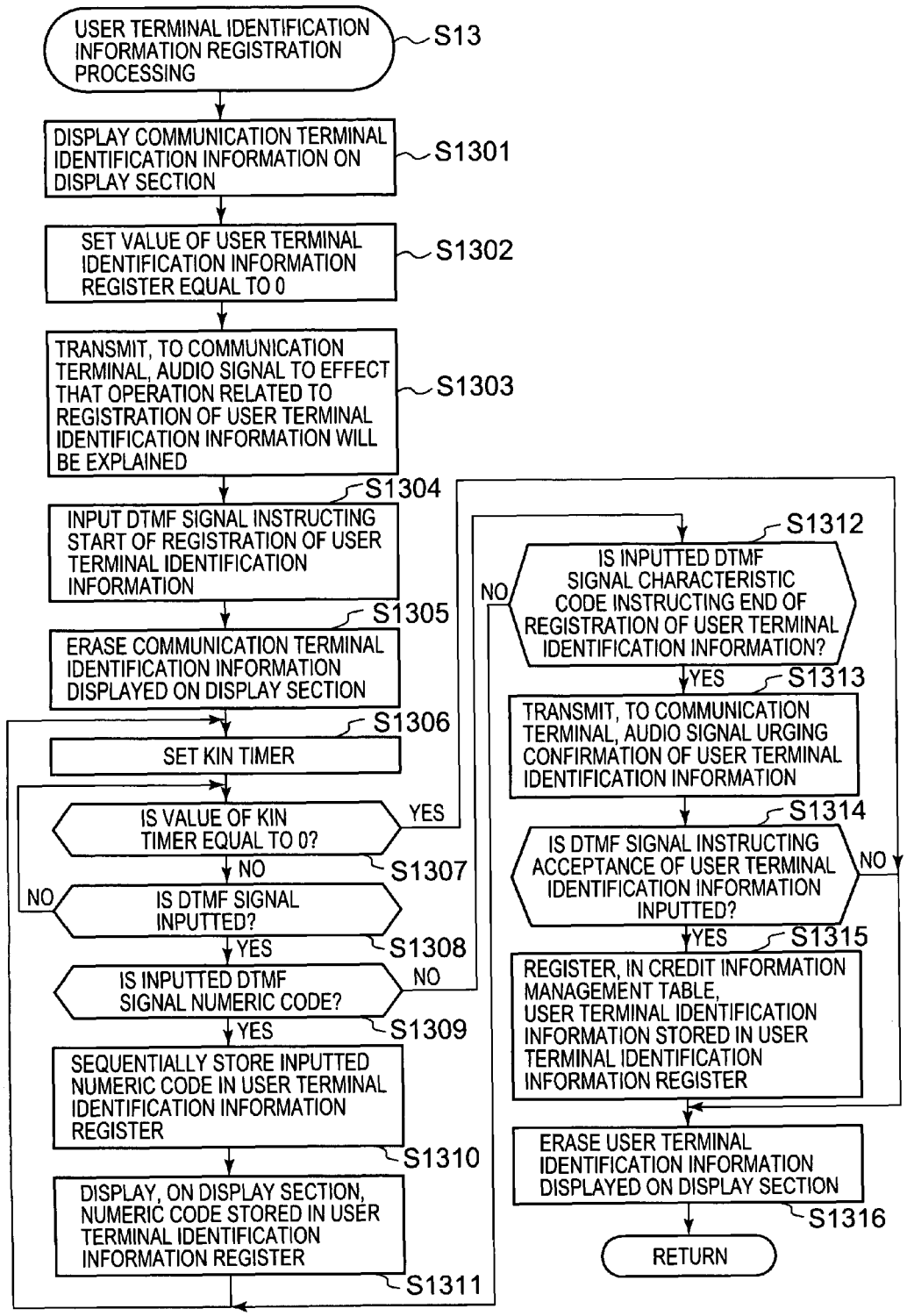
FIG. 11 is a flowchart showing a procedure of user terminal identification information registration processing.

FIG. 11 is a flowchart showing a procedure of the user terminal identification information registration processing.

First, the communication terminal identification information of the communication terminal 20 is displayed on the display section 12 (Step S1301), the user terminal identification information register of the RAM 14 is initialized to "0 (null)" (Step S1302). Subsequently, the guidance data 132 stored in the ROM 13 is read out, and an audio signal to the effect that the operation related to the registration of the user terminal identification information will be explained is transmitted through the communication section 17 to the communication terminal 20 on the call origination side (Step S1303).

In the communication terminal 20 that has received the audio signal, the operation in accordance with the audio guidance outputted based on the audio signal is performed by the user through the operation section 22, and the input signal (DTMF signal) corresponding to this operation is transmitted through the communication section 27 to the payment card 10.

Here, when a DTMF signal (for example, DTMF signal corresponding to a character code "*") instructing start of the registration of the user terminal identification information is inputted through the communication section 17 (Step S1304), the communication terminal identification information displayed on the display section 12 is erased (Step S1305), and a predetermined value is set in the KIN timer of the RAM 14, which defines an input standby time for the DTMF signal (Step S1306). Here, upon setting the time in the KIN timer, the CPU 11 counts down from the time (for example, 60 sec) set in the KIN timer to 0 based on the time period counted by the timer section 16 on a background of this processing.

Subsequently, it is judged whether or not a value of the KIN timer has reached "0". When it is judged that the value of the KIN timer is equal to 0 (Step S1307: Yes), the processing proceeds to Step S1316. Meanwhile, when it is judged that the value of the KIN timer is not equal to 0 (Step S1307: No), it is subsequently judged whether or not the DTMF signal is inputted through the communication section 17. When it is not confirmed that the DTMF signal is inputted (Step S1308: No), the processing returns to Step S1307.

Moreover, when it is judged in Step S1308 that the DTMF signal is inputted through the communication section 17 (Step S1308: Yes), it is judged whether or not the character code displayed by the inputted DTMF signal is a "numeric value" (Step S1309). Here, when it is judged that the character code is the "numeric value" (Step S1309: Yes), this character code (hereinafter, referred to as a numeric value code) is sequentially stored in the user terminal identification information register of the RAM 14 (Step S1310), and the numeric valued code stored in the user terminal identification information register is read out and displayed on the display section 12 (Step S1311). Then, the processing returns to Step S1306, and the KIN timer is set at the predetermined value one more time.

Meanwhile, when it is judged in Step S1309 that the character code is other than the "numeric value" (Step S1309: No), the processing proceeds to Step S1312, where it is judged whether or not the inputted DTMF signal is a DTMF signal (for example, DTMF signal corresponding to the character code "*") instructing end of the registration of the user terminal identification information. When it is judged that the inputted DTMF signal is not the DTMF signal to the effect that the registration of the user terminal identification information is to be ended (Step S1312: No), the processing returns to Step S1306. Note that, in this case, a character code that is not defined is transmitted from the communication terminal 20, and accordingly, an audio signal notifying a message to that effect may be transmitted to the communication terminal 20.

In Step S1312, when the DTMF signal instructing the end of the registration of the user terminal identification information is confirmed (Step S1312: Yes), the guidance data 132 stored in the ROM 13 is read out, and such numeric value code inputted until then, that is, the audio signal urging the confirmation of the user terminal identification information is transmitted to the communication terminal 20 (Step S1313).

Here, when it is judged that a DTMF signal instructing cancellation of the user terminal identification information is inputted through the communication section 17 (Step S1314: No), the processing proceeds to Step S1316. Meanwhile, when it is judged that a DTMF signal (for example, DTMF signal corresponding to the character code "*") instructing acceptance of the user terminal identification information is inputted through the communication section 17 (Step S1314: Yes), the user terminal identification information stored in the user terminal identification information register of the RAM 14 is registered in the credit information management table 151 of the storage section 15 (Step S1315), and then the processing proceeds to Step S1316.

In Step S1316, the user terminal identification information displayed on the display section 12 is erased (Step S1316), and this processing is ended.

Figure 12:
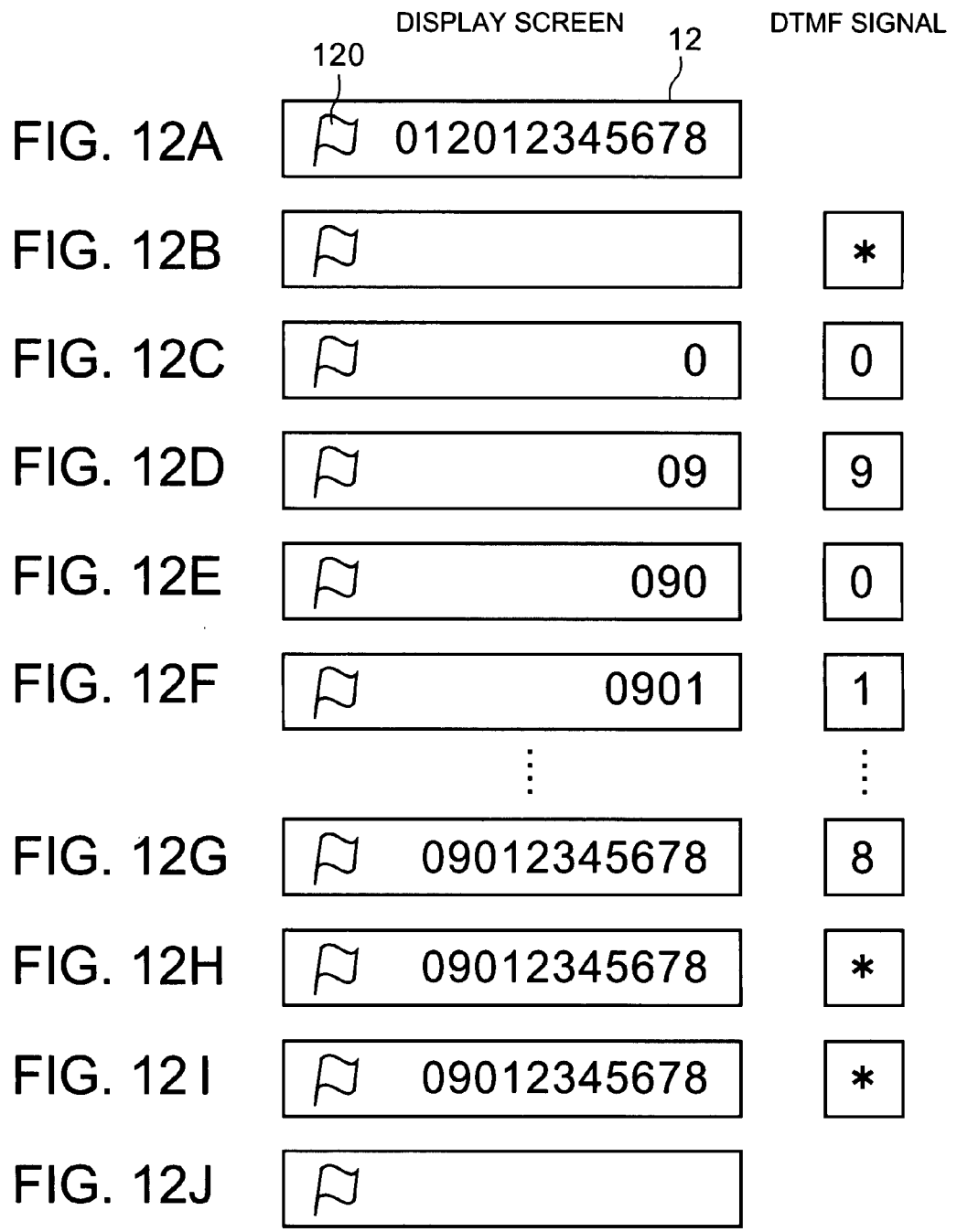
FIG. 12A is views showing relationships between DTMF signals transmitted from the communication terminal and display screens displayed on a display section of the payment card when the user terminal identification information registration processing is executed.
FIG. 12B is views showing relationships between DTMF signals transmitted from the communication terminal and display screens displayed on a display section of the payment card when the user terminal identification information registration processing is executed.
FIG. 12C is views showing relationships between DTMF signals transmitted from the communication terminal and display screens displayed on a display section of the payment card when the user terminal identification information registration processing is executed.
FIG. 12D is views showing relationships between DTMF signals transmitted from the communication terminal and display screens displayed on a display section of the payment card when the user terminal identification information registration processing is executed.
FIG. 12E is views showing relationships between DTMF signals transmitted from the communication terminal and display screens displayed on a display section of the payment card when the user terminal identification information registration processing is executed.
FIG. 12F is views showing relationships between DTMF signals transmitted from the communication terminal and display screens displayed on a display section of the payment card when the user terminal identification information registration processing is executed.
FIG. 12G is views showing relationships between DTMF signals transmitted from the communication terminal and display screens displayed on a display section of the payment card when the user terminal identification information registration processing is executed.
FIG. 12H is views showing relationships between DTMF signals transmitted from the communication terminal and display screens displayed on a display section of the payment card when the user terminal identification information registration processing is executed.
FIG. 12I is views showing relationships between DTMF signals transmitted from the communication terminal and display screens displayed on a display section of the payment card when the user terminal identification information registration processing is executed.
FIG. 12J is views showing relationships between DTMF signals transmitted from the communication terminal and display screens displayed on a display section of the payment card when the user terminal identification information registration processing is executed.

FIG. 12 is views showing relationships between the DTMF signals transmitted from the communication terminal 20 and display screens displayed on the display section 12 when the above-described user terminal identification information registration processing is executed.

First, in Step S1301, the communication terminal identification information (telephone number) of the communication terminal 20 that has turned to the call origination side is displayed on the display section 12 (FIG. 12A). In Step S1304 that follows, when the DTMF signal "*" instructing the start of the registration of the user terminal identification information is inputted through the communication section 17, the user terminal identification information displayed on the display section 12 is erased (FIG. 12B).

In Steps S1306 to S1311, when the DTMF signals are sequentially inputted through the communication section 17, numeric value codes ("0", "9", "0", "1" . . . "8" corresponding to these DTMF signals are sequentially displayed on the screen in order of the input in a state of being shifted to the left side of the screen (FIG. 12C to FIG. 12G).

In Step S1313, when the DTMF signal "*" instructing the end of the registration of the user terminal identification information is inputted through the communication section 17 (Step S1312: Yes), an input mode (Steps S1306 to S1311) of the user terminal identification information is ended (FIG. 12H). Then, in Step S1314 that follows, when the DTMF signal "*" instructing the acceptance of the inputted user terminal identification information is inputted through the communication section 17 (Step S1314: Yes), the user terminal identification information stored in the user terminal identification information register, that is, the user terminal identification information "09012345678" displayed on the display section 12 is registered in the credit information management table 151 in Step S1315 (FIG. 12I). Then, in Step S1316, the user terminal identification information displayed on the display section 12 is erased (FIG. 12J), and this processing is ended.

As described above, only when it is judged that the communication is made from the authorized communication terminal 20 corresponding to the management terminal identification information, that is, from the management-use communication terminal 20, the credit information management table 151 can be allowed to execute a function (hereinafter, referred to as a user terminal identification information registration function) related to the registration of the user terminal identification information. In such a way, only the communication from the communication terminal 20 (management terminal) held by an administrator of the payment card 10 can enable the user terminal identification information registration function to be executed. Accordingly, the user terminal identification information can be prevented from being registered or rewritten from the communication terminals 20 other than the management terminal.

Moreover, the user terminal identification information registration function can be enabled to be realized just for the predetermined time period counted by the timer section 16. Accordingly, the illegal use of the payment card 10 can be prevented, and the security of the payment card 10 itself can be enhanced.

Moreover, only the user terminal identification information inputted for the predetermined time period (time period until the KIN timer makes a time-out) is registered in the payment card 10, and accordingly, the user terminal identification information can be prevented from being registered carelessly. In such a way, for example, even if the administrator is absent from an office during a period while registering the user terminal identification information, it is possible to automatically disable the registration of the user terminal identification information to be executed after the time-out of the KIN timer. Accordingly, the user terminal identification information can be prevented from being registered carelessly.

Returning to FIG. 9, when it is judged in Step S12 that the terminal identification information and the management terminal identification information do not coincide with each other (Step S12: No), this terminal identification information and the user terminal identification information registered in the credit information management table 151 of the storage section 15 are collated with each other (Step S14). Here, when it is judged that the terminal identification information and the user terminal identification information do not coincide with each other (Step S14: No), this processing is immediately ended.

Meanwhile, when it is judged in Step S14 that the terminal identification information and the user terminal identification information coincide with each other (Step S14: Yes), the communication terminal identification information of the communication terminal 20 on the call origination side is displayed on the display section 12 (Step S15). Then, the payment flag that sets whether or not the current state is the payment-enabled state, the payment flag being stored in the RAM 14, is set from "OFF" indicating the payment-disabled state to "ON" indicating the payment-enabled state (Step S16), and the mark 120 displayed on the display section 12 is switched in response to this state of the payment flag (Step S17).

Subsequently, a predetermined value is set in the payment timer that shows a time during which the payment processing is permitted, the time being stored in the RAM 14 (Step S18). Here, upon setting the time in the payment timer, the CPU 11 counts down from the time (for example, 600 sec) set in the payment timer to 0 based on the time period counted by the timer section 16 on a background of this processing.

Next, the guidance data 132 stored in the ROM 13 is read out, and an audio signal that explains that the current state is the payment-enabled state or an audio signal that explains the current state is a state of being capable of changing the payment limit amount is transmitted to the communication terminal 20 on the call origination side through the communication section 17 (Step S19).

Subsequently, it is judged whether or not the request information from the payment processing apparatus 30 is inputted through the I/F section 18. When the input of the request information is confirmed (Step S20: Yes), the processing proceeds to payment processing of Step S21. The payment processing of Step S21 will be described with reference to FIG. 13.

Figure 13:
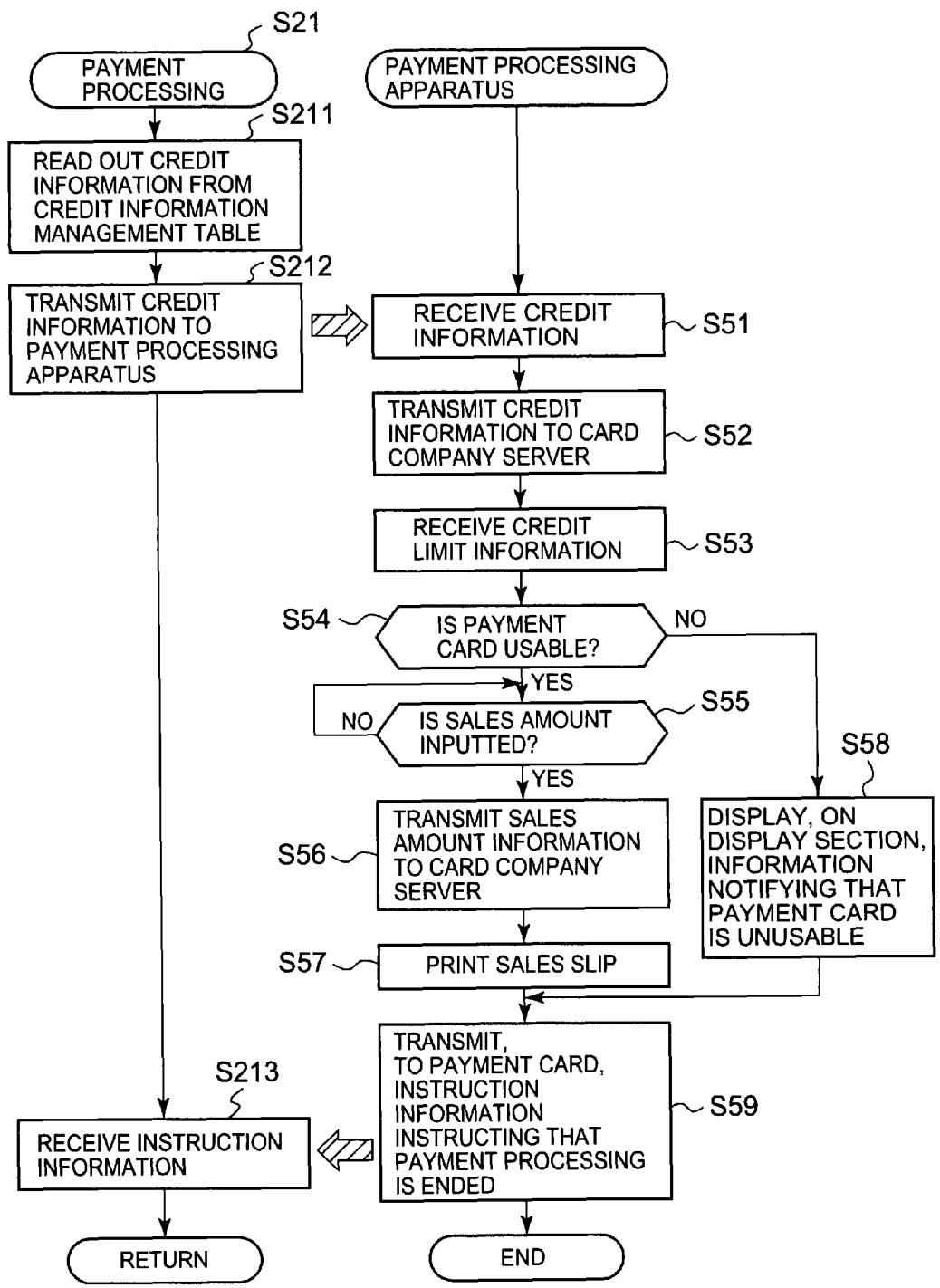
FIG. 13 is a ladder chart showing a procedure of payment processing.

FIG. 13 is a ladder chart showing a procedure of the payment processing. Note that, in this processing, the respective pieces of processing of Steps S51 to S59 represent the respective pieces of processing executed by cooperation between the CPU 11 of the payment processing apparatus 30 and the variety of programs stored in the storage section 34.

First, the credit information is read out from the credit information management table 151 stored in the storage section 15 (Step S211), and the credit information thus read out is transmitted through the I/F section 18 (Step S212).

Upon receiving, through the I/F section 36, the credit information transmitted from the payment card 10 (Step S51), the payment processing apparatus 30 transmits the credit information to the card company server 40 (Step S52). Then, upon receiving the credit limit information corresponding to the credit information from the card company server 40 (Step S53), the payment processing apparatus 30 judges whether the use of the payment card 10 is to be permitted or the use of the payment card 10 is to be refused based on the credit limit state instructed by the credit limit information (Step S54).

When it is judged in Step S54 that the use of the payment card 10 is to be permitted (Step S54: Yes), the payment processing apparatus 30 is on standby until the sales amount related to this payment processing is inputted through the operation section 32 (Step S55: No).

When it is judged that the sales amount is inputted (Step S55: Yes), the sales amount information indicating the sales amount is transmitted to the card company server 40 (Step S56). Then, after the sales slip on which the sales amount and the like are recorded is printed by the printing section 38 (Step S57), the processing proceeds to Step S59.

Meanwhile, when it is judged in Step S54 that the use of the payment card 10 is to be refused (Step S54: No), information that notifies a message to the effect that the payment card 10 is unusable is displayed on the display section 33 (Step S58), and then the processing proceeds to Step S59.

In Step S59, indication information that indicates that the payment processing is ended is transmitted through the I/F section 36 (Step S59), and the processing of the payment processing apparatus 30 is ended.

Meanwhile, when the payment card 10 receives, through the I/F section 18, the indication information transmitted from the payment processing apparatus 30 (Step S213), the processing of the payment card 10 proceeds to Step S22 of FIG. 9.

Returning to FIG. 9, in Step S22, the terminal identification information displayed on the display section 12 is erased (Step S22), and then the processing proceeds to Step S40 of FIG. 10, where the payment flag is set from "ON" indicating the payment-enabled state to "OFF" indicating the payment-disabled state (Step S40). Then, the mark 120 displayed on the display section 12 is switched in response to this state of the payment flag (Step S41), and this processing is then ended.

As described above, only when it is judged that the communication is made from the authorized communication terminal 20 corresponding to the user terminal identification information, that is, from the communication terminal 20 held by the user who is the owner of this payment card 10, a function (hereinafter, referred to as a credit communication function) related to the read-out of the credit information registered in the credit information management table 151 and the transmission of the credit information concerned can be executed. Accordingly, the payment can be prevented from being made by the communication from the unauthorized user, that is, from the communication terminal 20 other than the authorized communication terminal 20.

Moreover, the payment processing is enabled only for the predetermined time period (time period until the payment timer makes a time-out), and accordingly, the payment processing can be prevented from being performed carelessly. In such a way, for example, even if the payment flag of the payment card 10 is left in the "ON" state, the payment flag is automatically set to be "OFF" after the time-out of the KIN timer, and accordingly, the payment processing can be prevented from being performed carelessly.

Moreover, after the credit communication function is executed, this function can be set in an execution-disabled state, and accordingly, the payment processing can be prevented from being performed carelessly.

Furthermore, the mark 120 corresponding to the state of the payment flag is displayed on the display section 12, and accordingly, the user can be visually notified that the current state is the payment-enabled state.

Returning to FIG. 9, in Step S20, when the input of the request information is not confirmed (Step S20: No), it is judged whether or not the value of the payment timer becomes "0". When it is judged that the value of the payment timer is equal to 0 (Step S23: Yes), the processing proceeds to Step S22, and then this processing is ended through Steps S40 and S41 of FIG. 10.

Moreover, when it is judged in Step S23 that the value of the payment timer is not equal to 0 (Step S23: No), it is judged whether or not the DTMF signal (for example, DTMF signal corresponding to the character code "*") instructing start of the change of the payment limit amount is inputted through the communication section 17 (Step S24). Here, when the input of the DTMF signal instructing the start of the change of the payment limit amount is not confirmed (Step S24: No), the processing returns to Step S20.

Meanwhile, when it is judged in Step S24 that the DTMF signal instructing the start of the change of the payment limit amount is inputted (Step S24: Yes), the communication terminal identification information displayed on the display section 12 is erased (Step S25), and the payment limit amount register of the RAM 14 is initialized to "0 (null)" (Step S26). Then, the guidance data 132 stored in the ROM 13 is read out, and the audio signal to the effect that the operation related to the change of the payment limit amount will be explained is transmitted through the communication section 17 to the communication terminal 20 on the call origination side (Step S27).

Subsequently, the predetermined value is set in the KIN timer of the RAM 14 (Step S28). Here, upon setting the time in the KIN timer, the CPU 11 counts down from the time (for example, 60 sec) set in the KIN timer to 0 based on the time period counted by the timer section 16 on the background of this processing.

Subsequently, it is judged whether or not the value of the KIN timer becomes "0". When it is judged that the value of the KIN timer is equal to 0 (Step S29: Yes), the processing proceeds to Step S40, and this processing is then ended through Step S41.

Meanwhile, when it is judged that the value of the KIN timer is not equal to 0 (Step S29: No), it is judged whether or not the DTMF signal inputted through the communication section 17 is the DTMF signal (for example, DTMF signal corresponding to the character code "*") instructing end of the change of the payment limit amount (Step S30).

When it is judged in Step S30 that the inputted DTMF signal is not the DTMF signal instructing the end of the change of the payment limit amount (Step S30: No), it is judged whether or not the character code represented by the inputted DTMF signal is the numeric value code (Step S31). Here, when it is judged that the character code is not the numeric value code (Step S31: No), the processing returns to Step S28, where the KIN timer is set at the predetermined value one more time. Note that, in this case, the character code that is not defined is transmitted from the communication terminal 20, and accordingly, the audio signal notifying the message to that effect may be transmitted to the communication terminal 20.

Meanwhile, when it is judged in Step S31 that the character code is the numeric value code (Step S31: Yes), the numeric value code is sequentially stored in the payment limit amount register of the RAM 14 (Step S32), and the numeric value code stored in the payment limit amount register is read out and displayed on the display section 12 (Step S33). Then, the processing returns to Step S28 one more time, where the KIN timer is set at the predetermined value one more time.

Meanwhile, when it is judged in Step S30 that the DTMF signal instructing the end of the payment limit amount is inputted (Step S30: Yes), the guidance data 132 stored in the ROM 13 is read out, and the numeric value code inputted until then, that is, the audio signal urging the confirmation of the payment limit amount is transmitted to the communication terminal 20 (Step S34).

In Step S35 that follows, it is judged whether or not a DTMF signal instructing cancellation of the utilization limit amount inputted until then is inputted through the communication section 17. When it is judged that the DTMF signal instructing the cancellation is inputted (Step S35: No), the processing proceeds to Step S40, and this processing is ended through Step S41.

Moreover, when it is judged in Step S35 that a DTMF signal (for example, DTMF signal corresponding to the character code "*") instructing acceptance of the utilization limit amount inputted until then is inputted through the communication section 17 (Step S35: Yes), the utilization limit amount stored in the payment limit amount register is registered in the credit information management table 151 of the storage section 15 (Step S36), and the processing then proceeds to Step S37.

In Step S37, the guidance data 132 stored in the ROM 13 is read out, and an audio signal urging confirmation as to whether or not this processing is to be ended is transmitted to the communication terminal 20 (Step S37). Here, when it is judged that a DTMF signal instructing continuation of this processing is inputted through the communication section 17 (Step S38: No), the processing returns to Step S18. In this case, the payment timer is set one more time in Step S18, and the payment processing (Step S21) at the changed payment limit amount or a further change of the payment limit amount can be continuously performed.

Moreover, when it is judged in Step S38 that a DTMF signal instructing end of this processing is inputted through the communication section 17 (Step S38: Yes), the payment limit amount displayed on the display section 12 is erased (Step S39). Then, the payment flag is set from "ON" indicating the payment-enabled state to "OFF" indicating the payment-disabled state (Step S40), and the mark 120 displayed on the display section 12 is switched in response to this state of the payment flag (Step S41). Thereafter, this processing is ended.

FIG. 14 is views showing relationships between the DTMF signals transmitted from the communication terminal 20 and display screens displayed on the display section 12 when the above-described processing related to the change of the payment limit amount is executed.

Figure 14A:
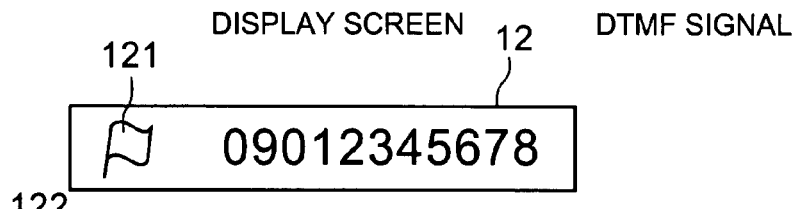
FIG. 14A is views showing relationships between the DTMF signals transmitted from the communication terminal and display screens displayed on the display section of the payment card when processing related to a change of a payment limit amount is executed.
Figure 14B:
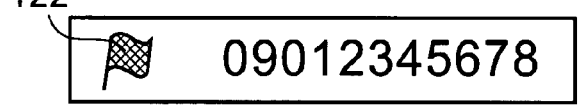
FIG. 14B is views showing relationships between the DTMF signals transmitted from the communication terminal and display screens displayed on the display section of the payment card when processing related to a change of a payment limit amount is executed.

First, in Step S14, the communication terminal identification information (telephone number) of the communication terminal 20 that has turned to the call origination side is displayed (FIG. 14A). Then, in Step S16 that follows, the display state of the mark 120 indicating whether or not the current state is the payment-disabled state or the payment-enabled state is switched in response to the state of the payment flag (FIG. 14B). Here, it is defined that a display state (showing a white flag) of a mark 121 indicates the payment-disabled state, and that a display state (showing a black flag) of a mark 122 indicates the payment-enabled state. Note that a method for indicating whether the current state is the payment-disabled state or the payment-enabled state is not limited to the above-described method of switching the display state of the mark 120. For example, in response to the state of the payment flag, a symbol "NO" indicating the payment-disabled state and a symbol "YES" indicating the payment-enabled state may be displayed on the display section 12.

Figure 14C:
FIG. 14C is views showing relationships between the DTMF signals transmitted from the communication terminal and display screens displayed on the display section of the payment card when processing related to a change of a payment limit amount is executed.
Figure 14D:
FIG. 14D is views showing relationships between the DTMF signals transmitted from the communication terminal and display screens displayed on the display section of the payment card when processing related to a change of a payment limit amount is executed.
Figure 14E:
FIG. 14E is views showing relationships between the DTMF signals transmitted from the communication terminal and display screens displayed on the display section of the payment card when processing related to a change of a payment limit amount is executed.
Figure 14F:
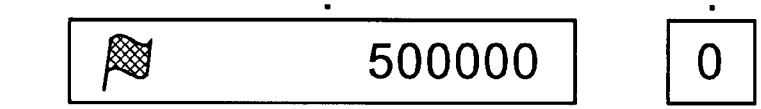
FIG. 14F is views showing relationships between the DTMF signals transmitted from the communication terminal and display screens displayed on the display section of the payment card when processing related to a change of a payment limit amount is executed.

In Step S24, when the DTMF signal instructing the start of the change of the payment limit amount is inputted (Step S24: Yes), the communication terminal identification information displayed on the display section 12 is erased in Step S25 (FIG. 14C). Subsequently, in Steps S28 to S33, when the DTMF signals are sequentially inputted through the communication section 17, numeric value codes ("5", "0" . . . "0") displayed by the DTMF signals are sequentially displayed on the screen in order of the input in a state of being shifted to the left side of the screen (FIG. 14D to FIG. 14F).

Figure 14G:
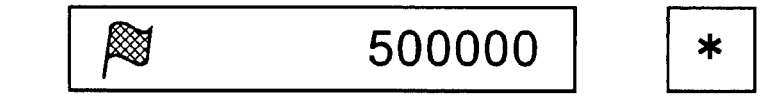
FIG. 14G is views showing relationships between the DTMF signals transmitted from the communication terminal and display screens displayed on the display section of the payment card when processing related to a change of a payment limit amount is executed.
Figure 14H:
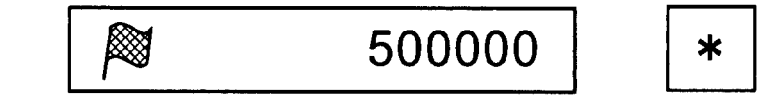
FIG. 14H is views showing relationships between the DTMF signals transmitted from the communication terminal and display screens displayed on the display section of the payment card when processing related to a change of a payment limit amount is executed.

Then, in Step S30, when the DTMF signal "*" instructing the end of the change of the payment limit amount is inputted through the communication section 17 (Step S30: Yes), an input mode (Steps S30 to S33) of the payment limit amount is ended (FIG. 14G). Then, in Step S35 that follows, when the DTMF signal "*" instructing the acceptance of the payment limit amount is inputted through the communication section 17 (Step S35: Yes), the payment limit amount stored in the payment limit amount register, that is, the payment limit amount "500000" displayed on the display section 12 is registered in the credit information management table 151 in Step S36 (FIG. 14H).

Figure 14I:
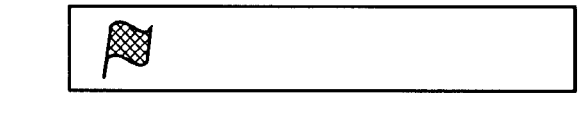
FIG. 14I is views showing relationships between the DTMF signals transmitted from the communication terminal and display screens displayed on the display section of the payment card when processing related to a change of a payment limit amount is executed.
Figure 14J:
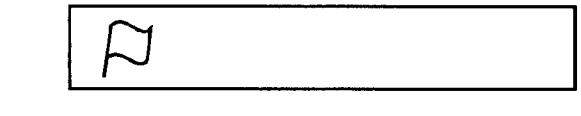
FIG. 14J is views showing relationships between the DTMF signals transmitted from the communication terminal and display screens displayed on the display section of the payment card when processing related to a change of a payment limit amount is executed.

Moreover, in Step S38, when the DTMF signal to the effect that this processing is to be ended is inputted through the communication section 17 (Step S38: Yes), the payment limit amount displayed on the display section 12 is erased in Step S39 (FIG. 14I). Then, in Step S41, the display state of the mark 120 indicating whether the current state is the payment-disabled state or the payment-enabled state is switched in response to the state of the payment flag (FIG. 14J), and this processing is ended.

As described above, only when it is judged that the communication is made from the authorized communication terminal 20 corresponding to the user terminal identification information, that is, from the communication terminal 20 held by the user who holds the payment card 10, a function (hereinafter, referred to as a payment limit amount change function) related to the change of the payment limit amount of the credit information management table 151 can be executed. Hence, the payment limit amount can be prevented from being changed by the communication from the unauthorized user, that is, from the communication terminal 20 other than the authorized communication terminal 20.

Moreover, the payment limit amount is made changeable only for the predetermined time period (time period until the KIN timer makes the time-out), and accordingly, the payment processing can be prevented from being performed carelessly. In such way, for example, even if the user of the authorized communication terminal 20 is absent from the office during a period while changing the payment limit amount, it is possible to automatically disable the change of the payment limit amount to be executed after the time-out of the KIN timer. Accordingly, the payment limit amount can be prevented from being changed carelessly.

Moreover, after the payment limit amount change function is executed, this function can be set in an execution-disabled state, and accordingly, the payment limit amount can be prevented from being changed carelessly.

Furthermore, the credit communication function or the payment limit amount change function can be set in an execution-disabled state in response to the instruction information transmitted from the communication terminal 20, and accordingly, the payment limit amount can be prevented from being changed carelessly.

Furthermore, the mark 120 corresponding to the state of the payment flag is displayed on the display section 12, and accordingly, the user can be visually notified that the current state is the payment-enabled state.

Note that the description contents in the above-described embodiment are a preferred example of the present invention, and the present invention is not limited to this.

For example, in the above-described embodiment, the portable card-shaped payment card is used as the terminal device; however, without being limited to this, the terminal device may be the cellular phone, the PDA, or the like.

Moreover, in the above-described embodiment, a mode is adopted, in which the connection from the communication terminal 20 to the payment card 10 is made through the public telephone switching network. However, other modes may be adopted without being limited to the above. For example, the following mode may be adopted. Specifically, the network interface such as the modem, the terminal adapter, the LAN adapter, and the wireless communication device in conformity with the Bluetooth standard is used as each of the communication section 17 of the payment card 10 and the communication section 27 of the communication terminal 20, and the connection is made from the communication terminal 20 to the payment card 10 through a wired or wireless network that connects the network interfaces of both of the communication sections 17 and the communication terminal 20 to each other.

In this case, in the management terminal identification information 133 of the payment card 10 and the user terminal identification information of the credit information management table 151, as the collation-use terminal identification information, there are registered the IP address, the MAC address, the Bluetooth address, and the Bluetooth clock, and the like, which are pregiven to the communication section 27 of the communication terminal 20. The CPU 11 collates the collation-use terminal identification information and the terminal identification information inputted from the outside through the communication section 17 with each other, thereby judges whether or not the communication is made from the authorized communication terminal 20 corresponding to the management terminal identification information or the user terminal identification information. Moreover, in this case, the guidance data transmitted from the payment card 10 to the communication terminal 20 may be video data or text data, which is displayable on the display section 23 of the communication terminal 20.

All of the disclosures including the patent specification, the claims, the attached drawings and the abstract of Japanese Patent Application No. 2006-179796 filed Jun. 29, 2006 are herein incorporated by reference.

Although various typical embodiments have been shown and described, the present invention is not limited to those embodiments. Consequently, the scope of the present invention can be limited only by the following claims.

What is claimed is:

1. A payment card which has an approximately same shape and same size as a credit card and performs payment processing with an external card payment processing apparatus, the payment card comprising:
    an interface section to transmit/receive data for card payment to/from the card payment processing apparatus;
    a telephone communication section to detect an arrival of a call with a telephone number via a public telephone network;
    a display section to identifiably display a state of the payment card;
    a storage section to store payment information for performing payment using the payment card, and to store specific telephone number information for making the payment card enter a payment-enabled state;
    a temporary storage section to store information indicating that the payment card is in a payment-disabled state in a default configuration, and to store information indicating that the payment card is in the payment-enabled state when the payment card is temporarily changed into the payment-enabled state;
    a judgment section to obtain the telephone number at a time of arrival of the call when the telephone communication section detects the arrival of the call from the public telephone network, and to judge whether or not the obtained telephone number agrees with the specific telephone number information stored in the storage section; and
    a control section to set the payment card to the payment-enabled state temporarily and to store the information indicating that the payment card is in the payment-enabled state in the temporary storage section when the judgment section judges that the obtained telephone number agrees with the specific telephone number information, and to permit reading of the payment information stored in the storage section with respect to an access from the card payment processing apparatus;
    wherein the display section is provided on a surface of the payment card, and displays that the payment card is in the payment-enabled state when the control section sets the payment card to the payment-enabled state temporarily.

2. The payment card according to claim 1, wherein the display section displays a first image which indicates that the payment card is in the payment-disabled state when the payment card is in the payment-disabled state, and displays a second image which indicates that the payment card is in the payment-enabled state when the payment card is in the payment-enabled state.

3. The payment card according to claim 1, wherein after the judgment section judges that the obtained telephone number agrees with the specific telephone number information stored in the storage section and the payment card is set to the payment-enabled state temporarily, the control section changes the setting of the payment-enabled state into the payment-disabled state after a lapse of a predetermined time, and restores the changed setting in the temporary storage section.

4. The payment card according to claim 1, wherein after the judgment section judges that the obtained telephone number agrees with the specific telephone number information stored in the storage section and the payment card is set to the payment-enabled state temporarily, the control section changes the setting of the payment-enabled state into the payment-disabled state after reading of the payment information is performed by the access from the card payment processing apparatus, and restores the changed setting in the temporary storage section.

5. A non-transitory computer-readable storage medium having stored thereon a program for controlling a payment card which has an approximately same shape and same size as a credit card and performs payment processing with an external card payment processing apparatus, the program controlling the payment card to perform functions comprising:
    transmitting/receiving data for card payment to/from the card payment processing apparatus;
    detecting an arrival of a call with a telephone number via a public telephone network;
    identifiably displaying a state of the payment card on a display section thereof;
    storing payment information for performing payment using the payment card, and storing specific telephone number information for making the payment card enter a payment-enabled state;
    storing information indicating that the payment card is in a payment-disabled state in a default configuration, and storing information indicating that the payment card is in the payment-enabled state when the payment card is temporarily changed into the payment-enabled state;
    obtaining the telephone number at a time of arrival of the call when the arrival of the call from the public telephone network is detected, and judging whether or not the obtained telephone number agrees with the stored specific telephone number information; and
    setting the payment card to the payment-enabled state temporarily and storing the information indicating that the payment card is in the payment-enabled state when it is judged that the obtained telephone number agrees with the stored specific telephone number information, and permitting reading of the stored payment information with respect to an access from the card payment processing apparatus;
    wherein the display section is provided on a surface of the payment card, and displays that the payment card is in the payment-enabled state when the payment card is set to the payment-enabled state temporarily.

* * * * *